Jan. 23, 1962  B. W. SCHAAF, JR  3,018,358
METHOD OF AND APPARATUS FOR WELDING
Filed April 28, 1959  7 Sheets-Sheet 1

INVENTOR
Bernard W. Schaaf Jr.
BY
Hyman Diamond
ATTORNEY

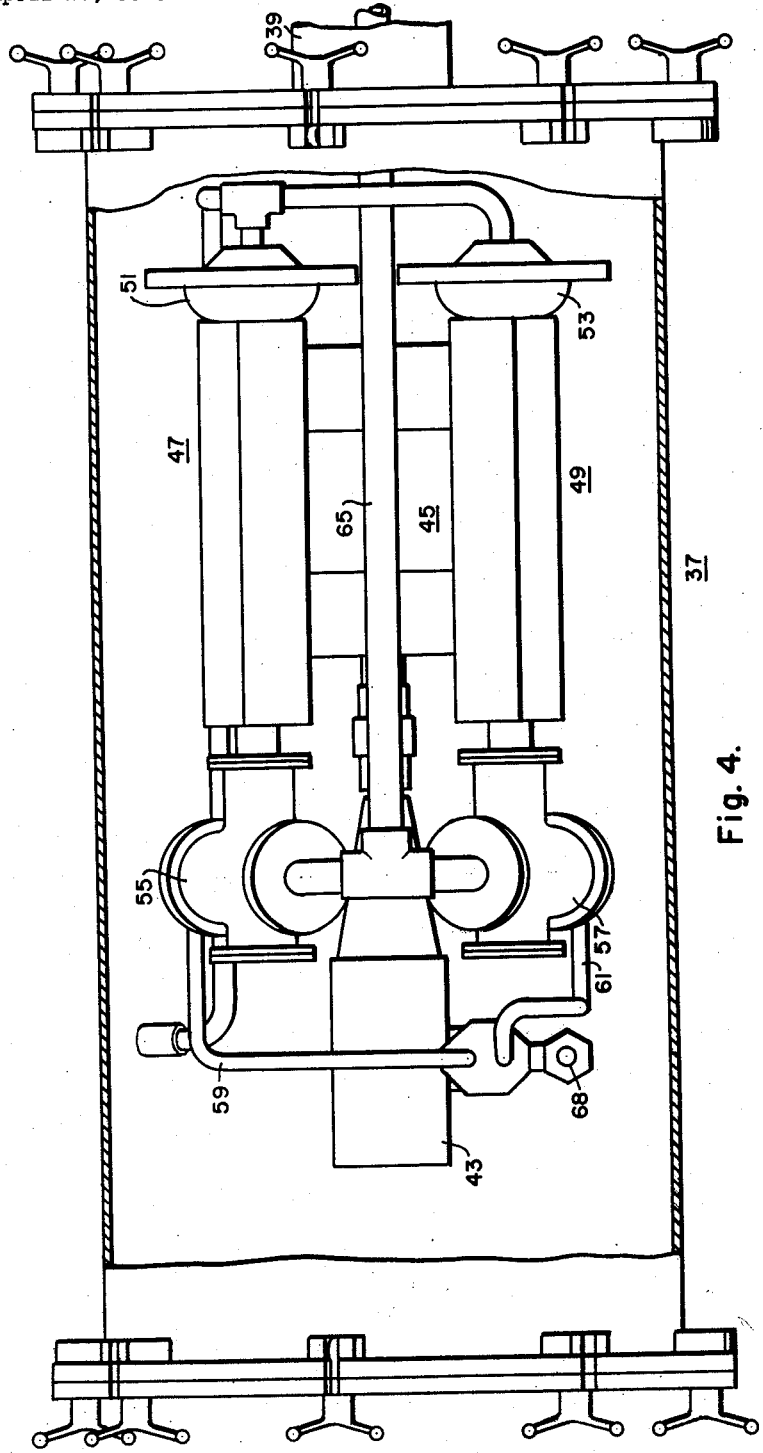

Jan. 23, 1962   B. W. SCHAAF, JR   3,018,358
METHOD OF AND APPARATUS FOR WELDING
Filed April 28, 1959   7 Sheets-Sheet 5

Jan. 23, 1962　　　B. W. SCHAAF, JR　　　3,018,358
METHOD OF AND APPARATUS FOR WELDING
Filed April 28, 1959　　　　　　　　　　　　　7 Sheets-Sheet 7

United States Patent Office 3,018,358
Patented Jan. 23, 1962

---

3,018,358
METHOD OF AND APPARATUS FOR WELDING
Bernard W. Schaaf, Jr., Pittsburgh, Pa., assignor to Westinghouse Electric Corporation, East Pittsburgh, Pa., a corporation of Pennsylvania
Filed Apr. 28, 1959, Ser. No. 809,572
6 Claims. (Cl. 219—72)

This invention relates to the welding art and has particular relation to the welding elements clad with a material such as zirconium or its alloys into an assembly which may be readily cooled. A typical zirconium base alloy is that described and claimed in Patent No. 2,772,964, issued December 4, 1956, to D. E. Thomas et al. and assigned to the present assignee. Such assemblies in certain applications may be utilized in a corrosive hot water medium and may be subject to irradiation. Application Serial No. 500,354, filed April 11, 1955, to Lloyd B. Kramer, Alvin J. Kasberg, Jr., and John J. Landkrohn and assigned to Westinghouse Electric Corporation is incorporated in this application by reference.

The above-identified Kramer application discloses a method and apparatus for joining such materials as zirconium in the practice and use of which the joint is produced by arc welding, preferably with a non-consumable electrode in an atmosphere of shielding gas. Specifically, the atmosphere is disclosed as highly pure helium. The method and apparatus disclosed in the Kramer application have been used for welding subassemblies and since the Kramer invention was created many assemblies have been highly successfully welded in the practice of this invention. In the welding of such assemblies of certain types it has become necessary to control precisely the penetration of the welds to assure that the root side of the seam is smooth and it is broadly an object of this invention to provide a method and apparatus for achieving this precise control of penetration, particularly in the welding of materials such as zirconium and the other materials mentioned in the Kramer application.

Another object of this invention is to provide a method for joining by welding adjacently disposed or juxtaposed parts of a wall of an enclosure with the penetration of the weld precisely controlled, and it is another object of this invention to provide apparatus peculiarly suitable for practicing this method.

In accordance with this invention the penetration is controlled by producing and maintaining a predetermined pressure differential between the inside of the enclosure being welded and the shielding atmosphere. The pressure differential is maintained by compressing the shield gas on the outside of the enclosure and feeding the compressed gas to the inside of the enclosure. The feed of the compressed gas is controlled precisely in dependence upon the pressure inside the enclosure to maintain the desired differential in pressure.

It is essential that the differential be of the proper magnitude. If it is too low, excessive penetration occurs, and if it is too high, the molten metal at the seam is blown out. One of the important aspects of the invention is the mechanism for maintaining the pressure differential at the desired magnitude. In arriving at this invention, it was discovered that the pressure within the enclosure may vary over a wide range. In the usual practice of this invention, the joint is produced by welding progressively, the region between the parts of the wall being joined from one end of the wall to the other end. As the welding progresses, the region between the parts being joined in the direction from which the weld is progressing is sealed, but shrinkage and distortion of the material being welded occurs by reason of the rise in temperature of the materials and this distortion tends to cause the regions between adjacent parts which are as yet not welded to open up. This tendency of the unsealed portion of the region between the parts to open up causes a wide variation as a function of time of the pressure within the enclosure from the time that the first seam until the time that the final seam is welded, and in arriving at this invention, it was realized that this variation must be compensated. In accordance with a specific aspect of this invention, the pressure within the enclosure is monitored in the region of the enclosure from which the weld is progressing, and facilities are provided to vary the input compressed shielding gas over a very wide range to compensate for the high leakage of the gas when it occurs, and to provide at all times for maintenance of the pressure differential when the leakage is relatively low.

The novel features considered characteristic of this invention are disclosed generally above. The invention itself both as to its organization and as to its method of operation, together with other objects and advantages thereof, will be understood from the following description of a specific embodiment taken in connection with the accompanying drawings, in which:

FIG. 4 is a view in top elevation of the compressing and pressure-controlling mechanism of the apparatus shown in FIG. 2;

Figure 1:
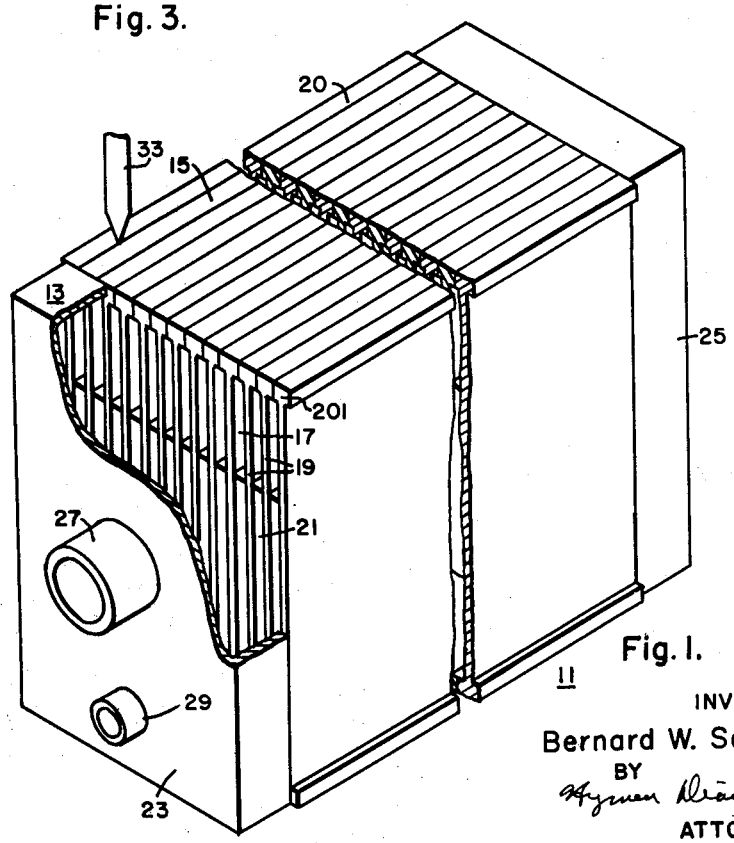
FIGURE 1 is a view in prespective showing the important features of an assembly which is welded in the practice of this invention.

The assembly 11 shown in FIG. 1 is made up of a plurality of elements 13 of I-cross sections composed of a material such as an alloy disclosed in the aforesaid Thomas et al. patent. These elements 13 are disposed with the long sides of their flanges 15 adjoining. An array of rectangular spaces 17 each bounded by the webs 19 of adjacent elements and the adjacent part of the flanges 15 of adjacent elements are thus formed. In utilizing these elements in certain applications, a cooling or heat-absorbing liquid flows through the rectangular spaces 17. Preparatory to the welding operation spacers 21 are inserted between the webs 19 bounding each of the spaces 17. These spacers 21 are about half the length as measured perpendicular to the flanges of the web 19 and are centrally disposed in the spaces 17 so that they divide each space 17 into two rectangles each having a height ¼ the height of the overall space 17. The spacers 21 are removed upon completion of the welding operation.

It is desirable that a joint be produced along the regions 20 between each pair of adjacent I-elements 13. For strength and inspection purposes, the weld effecting the joint should penetrate completely through the region 20 between the adjacent flanges.

In the practice of this invention, the channel spaces 17 are sealed at their ends by boxes 23 and 25 secured by welding over the ends of the element assemblies 11 prior to the I-element welding operation. The wall of the box 23, 25 on each side extends along the webs 19 of the end elements 13 and along the ends of the flanges 15 of all the elements 13. Each box 23, 25 is provided with a central opening 27 through which gas is supplied to the enclosure and opening 29 for monitoring the pressure in the enclosure.

Figure 2:
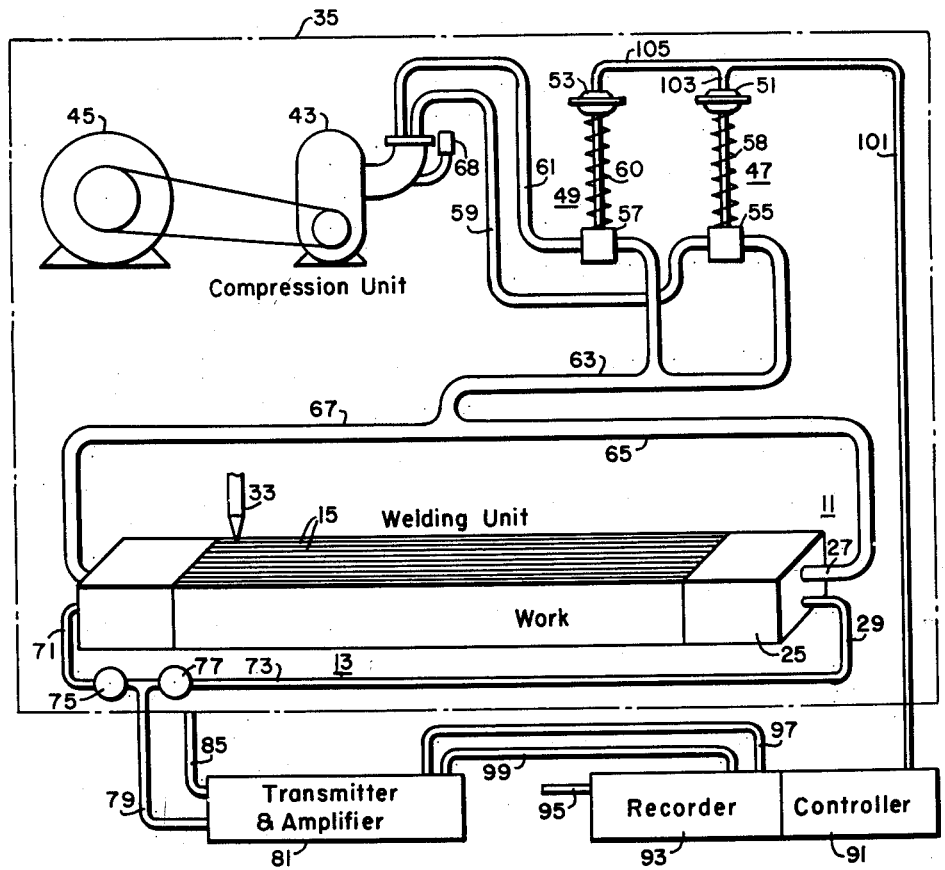
FIG. 2 is a diagrammatic view of a preferred embodiment of this invention.

The apparatus in accordance with this invention includes a welding unit, a compression unit, and a control unit. In the practice of this invention, the welding unit includes a container 31 such as is disclosed in the Kramer application in which an atmosphere of shielding gas is maintained and the flanges 15 of successive I-elements 13 are welded together by striking an arc between a nonconsumable electrode 33 and the flanges 15 in the region 20 between the elements and moving the arc along this region 20. The compression unit operates in the same shielding atmosphere to maintain a pressure differential between the inside of the enclosure 11–23–25 and the atmosphere in 31. This is illustrated diagrammatically in FIG. 2 in which the broken-line rectangle 35 represents the overall closed space in which both the enclosure 11–23–25 and the compression unit operate in the shielding atmosphere.

Figure 3:
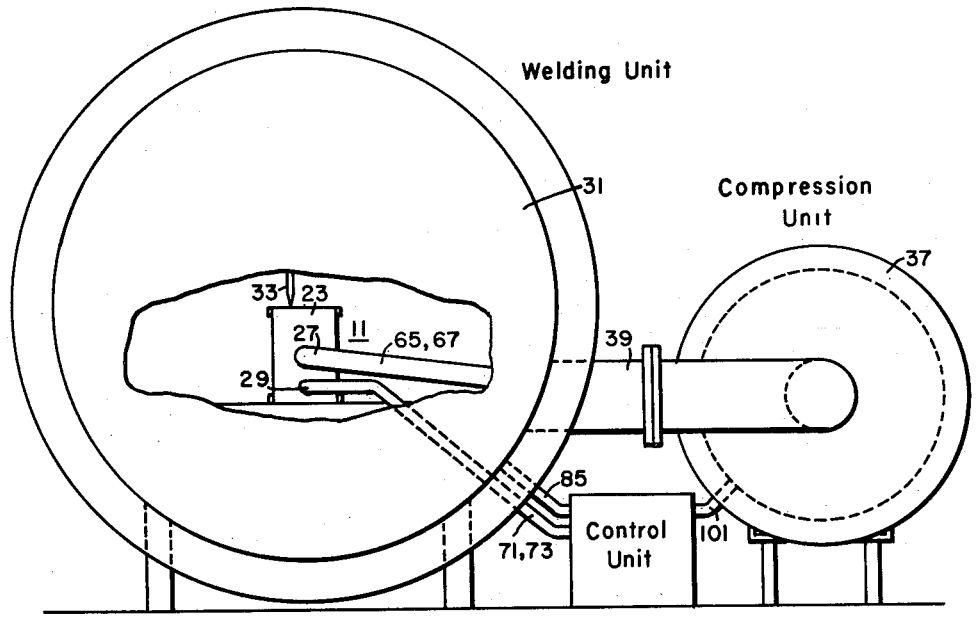
FIG. 3 is a view in end elevation showing the relationship of the compression vessel and the welding vessel of the apparatus shown in FIG. 2.
Figure 5:
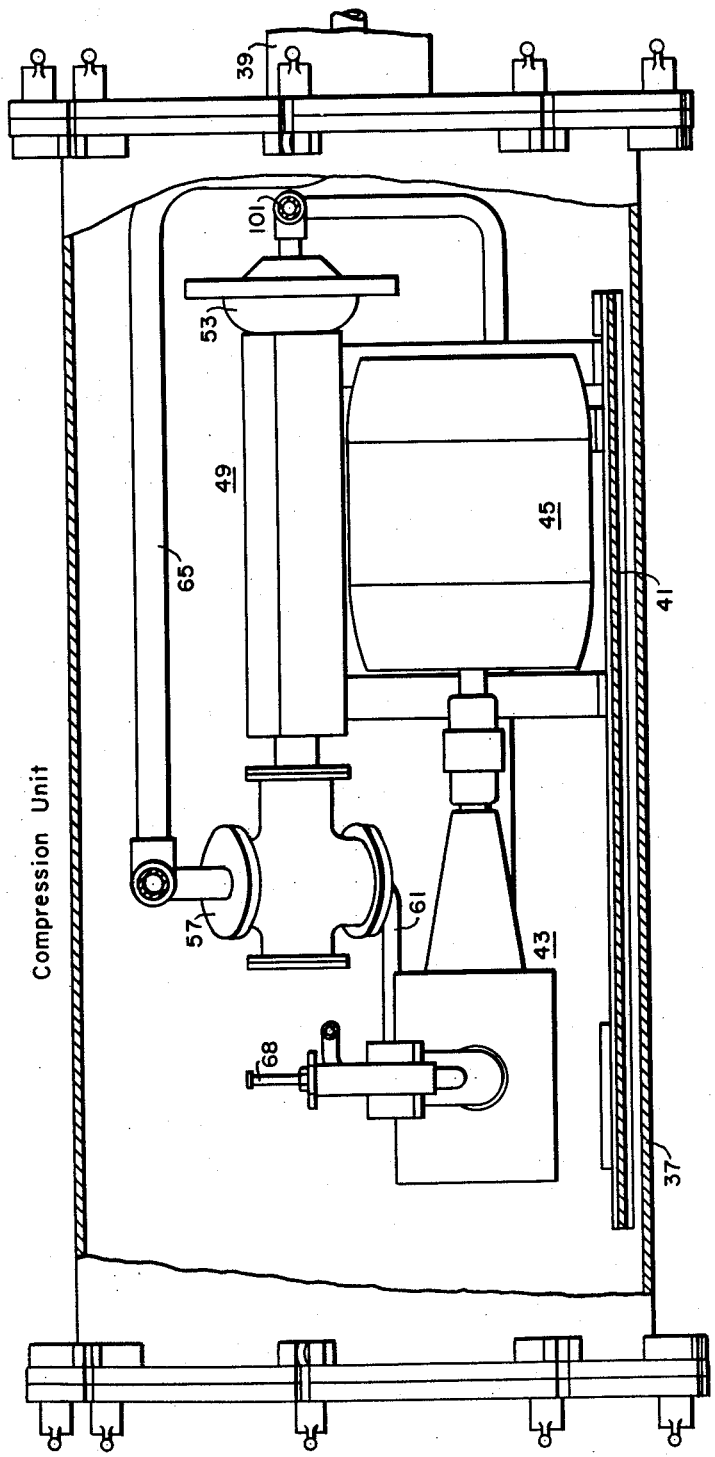
FIG. 5 is a view in side elevation of the compressing and pressure-controlling mechanism of the apparatus shown in FIG. 2.

The actual apparatus in accordance with this invention is shown in FIGS. 3 through 5. In this apparatus, the compression unit includes a container 37 which is sealed like container 31 but is in communication with container 31 through a tube 39. The atmosphere within container 31 and container 37 are then identical. The components of the compression unit are disposed within container 37 and the connections between the compression unit and the enclosure 11-23-25 pass through the tube 39. Within the container 37 there is a supporting plate 41 on which is mounted a compressor 43 driven by a suitable motor 45 which compresses the shielding gas in the shielding atmosphere. A pop-off valve 63 is connected to the compressor to limit the pressure at which it operates and thus to avoid unnecessary overloading.

The compression unit further includes a pair of valves 47 and 49, one 47 capable of supplying gas at a high rate, and the other 49, capable of supplying gas at a lower rate. Each valve 47, 49 has a diaphragm 51 and 53, respectively, and a valve body 55 and 57, respectively, the orificing mechanism (not shown) of which is actuated by the diaphragm against the action of a spring 58 and 60, respectively. The diaphragms 51 and 53 control the flow of gas hrough the valve bodies 55 and 57.

The inlet to each of the valve bodies 55 and 57 is connected through a tube 59 and 61, respectively, to the compressor 43. The outlets of the valve bodies 55 and 57 are connected to a common tube 63 which passes through the tube 39 and is connected to the gas openings 27 in the boxes 23 and 25 on the ends of the enclosure 11-23-25 through branch tubes 65 and 67.

The other openings 29 in the boxes 23 and 25 are connected through tubes 71 and 73 (FIG. 2) and through manually operable or solenoid actuable valves 75 and 77 to a common conductor 79 which is connected to a transmitter amplifier 81 of the pneumatic type in the control unit. The manual valves 75 and 77 serve to connect one or the other of the tubes 75 and 77 depending on the end of the enclosure from which the welding is progressing to the transmitter-amplifier 81. The transmitter-amplifier 81 is also connected to the shielding atmosphere through another tube 85 and a pressure within the enclosure 11-23-25 is compared with the pressure in the shielding atmosphere.

The control unit includes in addition to the transmitter-amplifier 81 a controller 91 and a recorder 93. The control unit is pneumatically operated and is supplied with air from a suitable source (not shown) through a tube 95 connected to the recorder 93. The transmitter-amplifier 81 is supplied with air through a tube 97 between the recorder 93 and the amplifier 91 and transmits an amplified pneumatic signal to the recorder through another tube 99. The controller 91 is connected to the recorder 93 so that it operation depends on the signal received from the transmitter-amplifier 81 and the output of the controller 91 is connected through a common tube 101 and branch tubes 103 and 105 to the diaphragms 51 and 53 of the valves 47 and 49 and controls the openings in the valve bodies 55 and 57.

In the use of the apparatus, the welding electrode 33 is set to weld progressively along the regions 20 between each pair of adjacent I-elements 13 in its turn. The welding joint is produced by seam fusion welding from one end of the assembly 11 to the other. Preparatory to the welding operation, the valve 75 of the monitoring tube 71 at the end from which the welding operation is to be carried out (left-hand in FIG. 2) is opened so that the differential pressure is based on the pressure at this end of the assembly. The compressor 43 and the other components are then energized, an arc is fired, and the welding proceeds.

During the welding operation the compressor operates at about 1700 r.p.m. (in the apparatus actually used as described above), drawing in the shielding gas at approximately atmosphere pressure from the atmosphere in which the welding is being carried out and supplying this gas to the rectangular openings 17 of the assembly 11. The pop-off valve limits the compression to 2 pounds p.s.i. The differential in pressure is measured by the tubes 79 and 85 from the enclosure 11—23—25 and the container 31, respectively, and the differential is maintained by controlling the diaphragms 51 and 53 of the valves 47 and 49. When the differential is such that the signal transmitted to the diaphragms 47 and 49 is of the order of 2 to 10 p.s.i., the low capacity valve 49 operates, permitting moderate flow of the shielding gas into the enclosure 11—23—25. When the signal is between 10 and 18, both valves 47 and 49 are opened and substantial gas flows into the enclosure 11—23—25. The pressure differential limits the penetration of the welds.

The problems from which this invention originated and the success of the invention are presented in the following discussion:

An understanding of this invention requires an understanding of the structure of an assembly 11 as shown in FIG. 1. A core of non-corrosion resistant material is enclosed within the webs 19 of the I-elements 13 forming the assembly 11. In utilizing the assembly 11 in certain applications, heat which may be developed in the core of non-corrosion resistant material is transferred to water which flows in the spaces or channels 17. The assembly is fusion welded as disclosed in the Kramer application identified above with the flanges 201 of adjacent elements serving as the weld metal which effects the junction. It is essential that the weld metal shall be restricted from flowing down into the channels 17 so that it covers any part of the heat-transfer surfaces of the walls bounding the channels which are opposite. Such flow or penetration would result in suppression of the cooling effect of the water and the core would melt in the region where the cooling is suppressed. This means that unless penetration is closely controlled the extent of the core in the web must be reduced.

In the fabrication of welded assemblies for certain applications, it is essential that to the extent practicable, the penetration of the welds be 100 percent. Weld penetration less than 100 percent presents an inspection dilemma in that no method is known for the direct determination of the actual minimum welded wall achieved in the sub-assembly after machining and assembly into a cluster. Seams exhibiting 100 percent penetration may be inspected visually for evidence of weld bubble which might extend to the core of an I-element. But, ideally, it is desirable that the penetration be exactly 100 percent±0 through the "as-machined" flanges of the I-elements 13, and it is essential that the penetration be precisely controlled.

One of the chief difficulties associated with the fabrication of fusion welded subassemblies has been the inability to adequately control the degree of weld penetration achieved while producing 100 percent penetration at every element to element seam weld. The need for relatively close control of weld penetration becomes apparent when optimum design requirements are considered. Ideally, a designer would like to specify a minimum welded wall (that is the least wall thickness which would serve) for strength and a maximum core width for heat transfer area contained within a minimized subassembly cross section for conservation of space. Non-heat transfer surface in subassembly water channels 17, in excess of the "weld free zone" specified, represents a decrease in the operating efficiency of the entire group of assemblies. A one percent increase in core width may be expressed as being equivalent to a one percent decrease in the number of clusters required for a specified power output for a specific group of assemblies. This comparison is valid only if the larger core width may be taken advantage of during the design stages of assembly production. But, if the weld penetration cannot be maintained precisely, the core width must be shortened to assure that no weld bubble penetrates over the part of the web 19 that clads the core, and thus there is a decrease of the heat transfer surface. This shortening of the core width is minimized as the ideal of 100±0 percent weld penetration is approached.

This ideal cannot be realized with fusion welding techniques in accordance with the teaching of the prior art. The major forces acting on a molten weld puddle along a seam are surface tension and gravity. These forces oppose each other, but the effect of surface tension is more than countered by gravity causing the weld puddle to drop into the coolant channel 17. The degree to which this drop-through (excess penetration) occurs is the result of a multitude of welding variables such as flange to flange match up, current, voltage and seam tracking accuracy. Thus, the resulting excess weld penetration in prior art practice is highly variable with a maximum of the order of 0.120 inch for a flange seam thickness of about 0.135 inch. Provision for this amount of weld puddle drop-through results in 0.240 inch reduction in core width along the webs 19 of the I-element 13 below the ideal condition to prevent penetration of the weld bubbles over the heat-transfer surface.

To provide sufficient resistance to the effect of gravity on the weld bubble the interior of the sub-assembly is, according to this invention, pressurized during fusion welding. The effect achieved is the minimization of the weld penetration range and the suppression of the extremes in weld puddle drop-through, while still producing visual evidence of at least 100 percent weld penetration along the entire length of nearly every seam. Gas backup welding is capable of limiting excess weld penetration to about 0.060 inch for a flange seam thickness of 0.135 inch. Provision for this amount of weld puddle drop-through results in only a 0.120 inch reduction in core width below the ideal condition, or half that required for fusion welding without the pressurized gas backup. The degree of control appears to be independent of the type of zirconium base alloy being welded, i.e., regardless of whether it is atmosphere or vacuum melted material.

The equipment required for production fusion welding of core bearing assemblies with gas backup as disclosed in this application in a typical situation consists of a positive displacement blower 43 capable of approximately 40 c.f.m., a relief valve 68, a throttling valve 47–49, a differential pressure controller 91 and recorder 93 and associated plumbing and electrical equipment.

Functionally, the blower 43 compresses the helium welding-box atmosphere to about 2 p.s.i. and transports it through valves 47 and 49 which reduce the pressure to about 4½ inches of water into the assembly 11. Leakage back into the welding chamber occurs through the unwelded seams between adjacent I-elements 13 establishing a pressure differential across the side wall of the assembly. It is this positive pressure differential that counteracts the gravitational force acting on the molten weld bubble and minimizes the extent of weld drop-through.

The distribution of weld penetration experienced in actually welding a number of assemblies 11 with the gas backup has yielded an end product having visual evidence of weld penetration extending nearly the entire seam length in every channel.

FIGS. 6a, 6b, 6c, 7a, 7b, 7c and 8 show how remarkably successful the welding in accordance with this invention has been. In deriving the data on which these graphs are based, the seams of assemblies 11 welded in accordance with the teaching of the prior art and in accordance with this invention were subjected to measurement. In each case measurements were derived for the maximum penetration of the seam, the minimum penetration of the seam and the average penetration of the seam. Since the channels at the ends of an assembly 11 are different than the channels in the center, the channels were identified alphabetically from one end element 13 of the assembly to the other and seams associated with channels 17 bounded by like as-machined elements were compared. One set of like channels are A, B, C, S, T, U; another set D through R.

The data is plotted in FIGS. 6a through 8. In FIGS. 6a through 7c, excess weld penetration in inches is plotted vertically and the cumulative percent frequency of the occurrence of the excess penetration horizontally. The abscissa of a point on one of the curves 6a through 7c gives the percentage of the total measurements corresponding to the curve for which the excess penetration is equal to, or less than, the ordinate of the curve. Ideally, it is desired that the curves be substantially horizontal at low magnitudes of excess penetration.

Figure 6A:
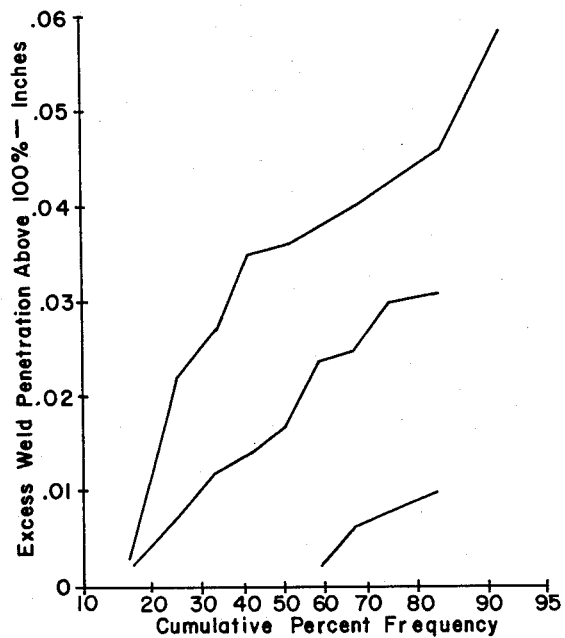
FIGS. 6a, 6b, 6c, 7a, 7b, 7c and 8 are graphs showing the advantages of this invention.
Figure 6B:
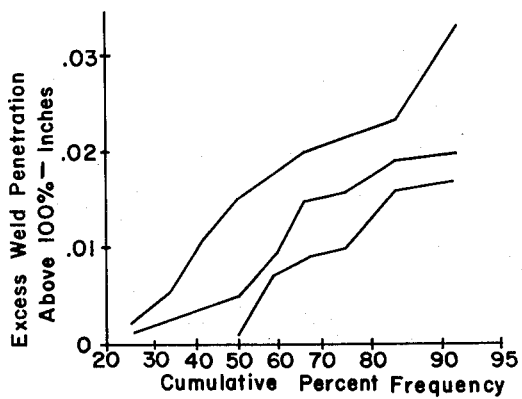
Figure 6C:
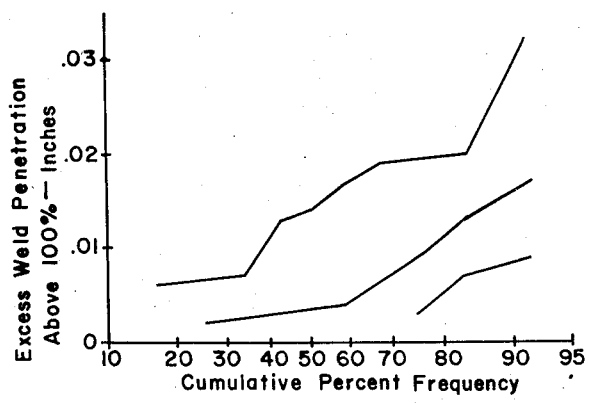
Figure 7A:
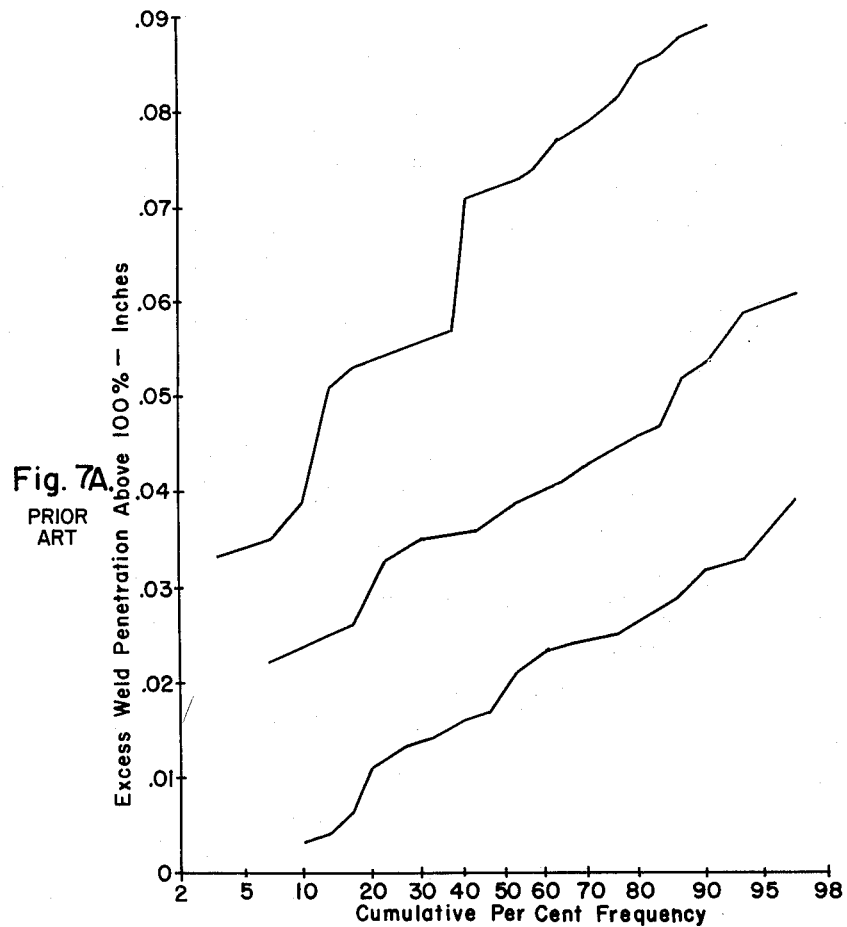
Figure 7B:
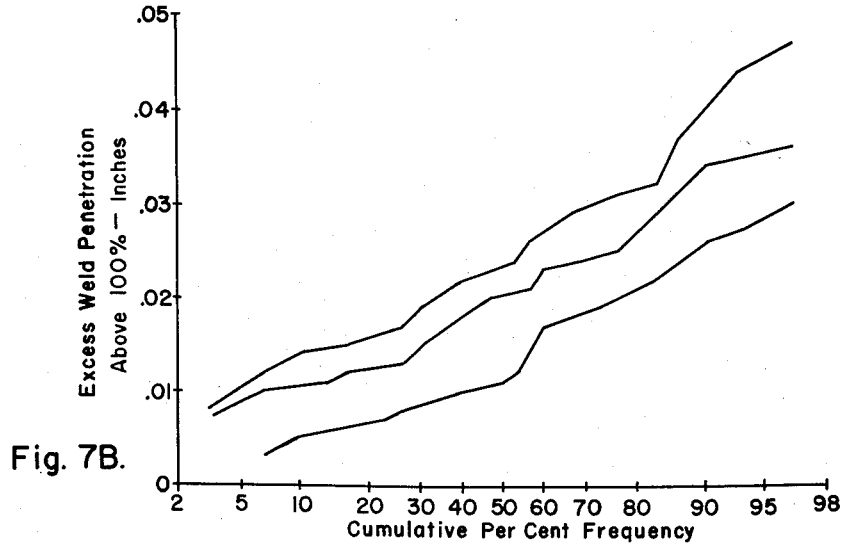
Figure 8:
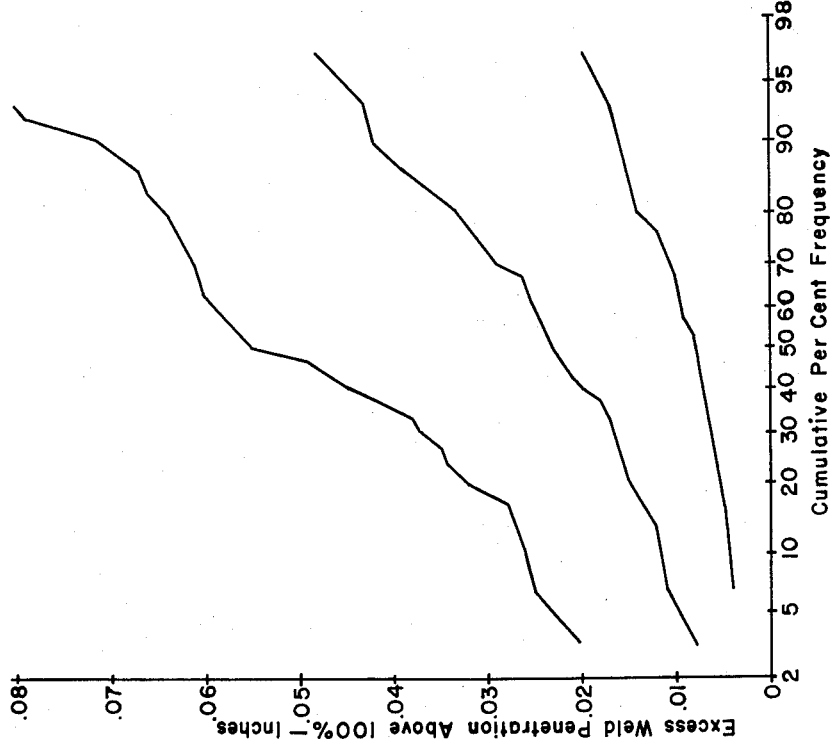
Figure 7C:
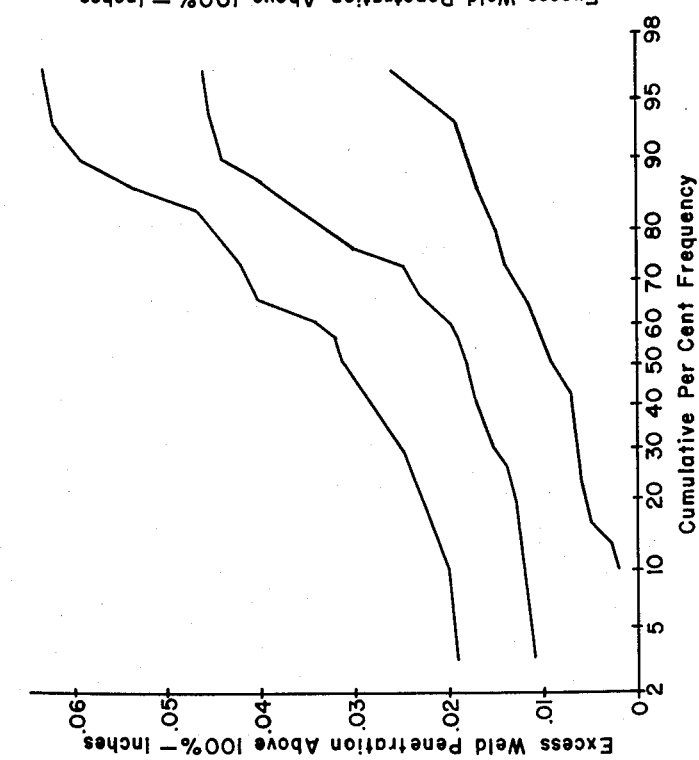

In FIGS. 6a curves for channels A–C and S–U made in accordance with the teaching of the prior art are presented; in FIGS. 6b and 6c corresponding curves for channels made in accordance with this invention are shown. FIGS. 7a, 7b, 7c show analogous curves for channels D through R. FIG. 8 presents an overall comparison for channels D through R based on the range of excess penetration for ecah of a plurality of channels made as indicated on the drawing. In arriving at the data for FIG. 8 the difference between the maximum and the minimum excess penetration for each seam as measured was calculated and plotted.

FIGS. 6a through 8 show the advantages of the present invention. As evidenced by the weld penetration distribution curves, the extent of excess penetration has been controlled by the gas backup to approximately 0.065 inch in the standard channels, D–R. In some instances the maximum weld penetration has been held to less than 0.050 inch, with visual evidence of weld penetration in every channel. A standard production subassembly welded without the use of gas backup, for purposes of comparison, yielded a maximum weld penetration greater than 0.120 inch. A comparison of the distributions of weld penetration ranges for gas backup versus no-gas backup reveals that only 50 percent of the ranges for no-gas backup are less than 0.055 inch; whereas, 98 percent of the ranges for gas backup are below 0.055 inch.

Gas backup has been equally effective in the welding of the end channels A–C, S–U, but not to the extent originally anticipated. Experience indicates that about 0.045 inch maximum weld penetration can be maintained in these channels.

Weld penetration distribution curves has been plotted for both end A–C, S–U and standard channels D–R of one subassembly 11 fabricated from vacuum-melted zirconium base alloy in accordance with this invention. The subassembly met all requirements for weld penetration. The local areas of overpenetration fall within the limits specified for penetration of weld metal in the weld free zone.

From examination of the weld distribution curves for both atmosphere-melted zirconium-base alloy and vacuum-melted zirconium-base alloy subassemblies 11, according to the invention, the relationship of the maximum, minimum and average weld penetration is relatively the same. A comparison of the curves for distribution of weld penetration range for both atmosphere and vacuum-melted subassemblies indicates the range to be of the same magnitude.

While a preferred embodiment of this invention has been disclosed herein, it is understood that many modifications thereof are feasible. This invention then is not to be restricted except insofar as is necessitated by the spirit of the prior art.

I claim as my invention:

1. The method of joining, in an enclosed atmosphere of a shielding gas, adjacently disposed parts of the wall of an enclosure, said parts extending from one side to another side of said wall, the region between said parts communicating between the inside of said enclosure and said atmosphere, the said method comprising compressing said shielding gas, conducting said compressed shielding gas to the inside of said enclosure to maintain a pressure differential between the inside of said enclosure and said atmosphere, welding said parts in the region between them progressively from said one side to said other side, measuring the shielding gas pressure within said enclosure near said one side, and responsive to said measurement maintaining said pressure differential at a predetermined magnitude.

2. Apparatus for joining by welding adjacently disposed parts of a wall of an enclosure, the region between said parts communicating between the inside of said enclosure and the outside, the said apparatus comprising means for enclosing said enclosure in an atmosphere of a shielding gas, means to be connected to the inside of said enclosure for compressing said shielding gas within said enclosure, pressure monitoring means connected to the inside of said enclosure, and means responsive to said monitoring means and connected to said compressing means to produce a predetermined pressure differential between the inside of said enclosure and said atmosphere.

3. The method of joining adjacently disposed parts of the wall of an enclosure, said parts extending from one side to another side of said wall, the region between said parts communicating between the inside of said enclosure and the outside, the said method comprising producing a pressure differential between the inside of said enclosure and the outside, welding said parts in the region between them progressively from said one side to said other side, measuring the pressure within said enclosure near said one side, and responsive to said measurement maintaining said pressure differential at a predetermined magnitude.

4. Apparatus for joining by welding adjacently disposed parts of a wall of an enclosure, the region between said parts communicating between the inside of said enclosure and the outside, the said apparatus comprising means for enclosing said enclosure in an atmosphere of a shielding gas, means to be connected to the inside of said enclosure for compressing said shielding gas within said enclosure, pressure monitoring means connected to the inside of said enclosure for measuring the difference between the pressure inside of said enclosure and the pressure of said atmosphere, and means responsive to said monitoring means and connected to said compressing means to produce a predetermined pressure differential between the inside of said enclosure and said atmosphere, said responsive means including first valve means when opened permitting shielding gas at a first rate to flow into said enclosure, and second valve means when opened permitting shielding gas at a second substantially higher rate than said first rate to flow into said enclosure, said second valve means opening for a substantially higher pressure difference as measured by said monitoring means than said first valve means.

5. Apparatus for joining adjacently disposed parts of a wall of an enclosure, the region between said parts communicating between the inside of said enclosure and the outside and extending from one end of said enclosure to the other end of said enclosure, said joining being effected by welding along the region between said parts progressively from said one end to said other end, the said apparatus comprising means for enclosing said enclosure in an atmosphere of shielding gas, means to be connected to both said ends of said enclosure for compressing said shielding gas within said enclosure, pressure monitor means to be connected to the inside of said enclosure for measuring the pressure difference between the inside of said enclosure and the outside, and means responsive to said pressure monitoring means and connected to said compressing means to produce a predetermined pressure differential between the inside of said enclosure and the outside.

6. The method of joining adjacently disposed parts of a wall of an enclosure, the region between said parts extending from one side of said wall to another side of said wall, the region between said parts before being joined communicating between the inside of said enclosure and the outside, the said method comprising arc welding said parts along said region progressively from said one side to said other side, enshrouding the welding arc in a shield of non-reactive gas, compressing said shielding gas, conducting said compressed gas to the inside of said enclosure to maintain a pressure differential between the inside of said enclosure and said shield, measuring the pressure of said gas on the inside of said enclosure near said one side, and responsive to the measurement maintaining said differential at a predetermined magnitude.

References Cited in the file of this patent
UNITED STATES PATENTS

| | | |
|---|---|---|
| 2,685,857 | Kuhn | Aug. 10, 1954 |
| 2,747,065 | Diehl | May 22, 1956 |
| 2,804,885 | Mott | Sept. 3, 1957 |
| 2,819,517 | Pursell | Jan. 14, 1958 |
| 2,844,707 | Mazzagatti | July 22, 1958 |
| 2,856,510 | Jones | Oct. 14, 1958 |
| 2,910,572 | Diehl | Oct. 27, 1959 |